June 15, 1943.  S. W. BRIGGS  2,321,985
METHOD AND APPARATUS FOR SEPARATING
SOLIDS FROM FLUIDS
Filed Oct. 28, 1938  2 Sheets-Sheet 1
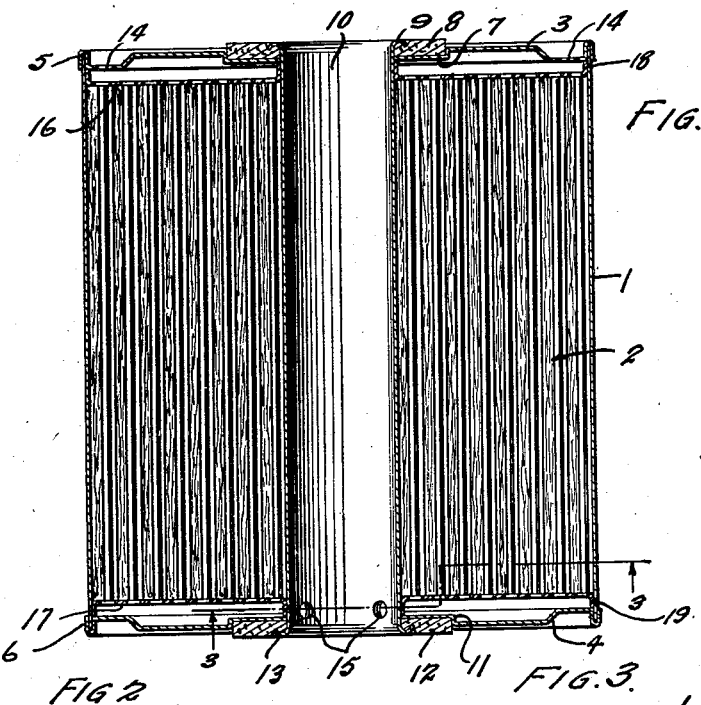
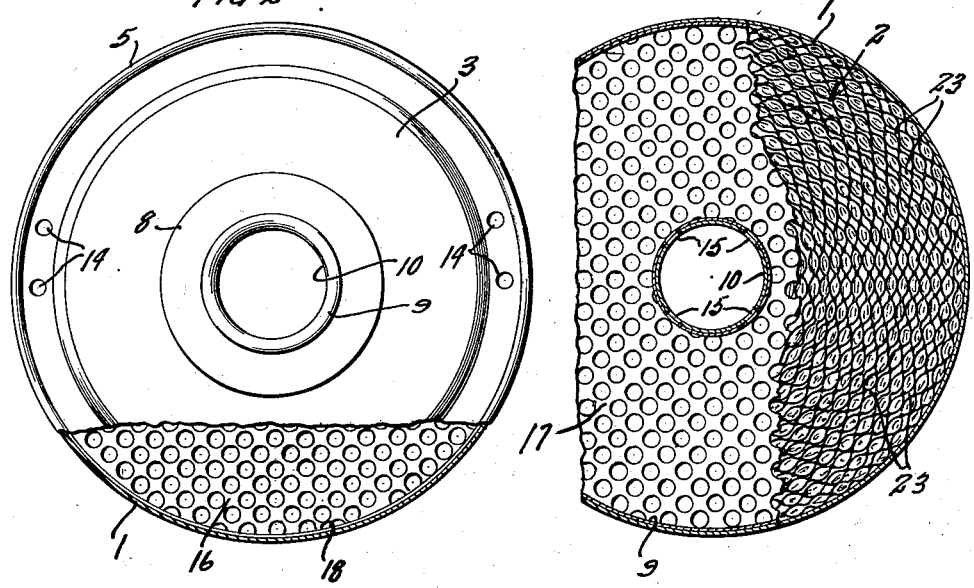
Inventor
SOUTHWICK W. BRIGGS
By Semmes, Keegin & Semmes
Attorneys June 15, 1943.  S. W. BRIGGS  2,321,985
METHOD AND APPARATUS FOR SEPARATING
SOLIDS FROM FLUIDS
Filed Oct. 28, 1938  2 Sheets-Sheet 2
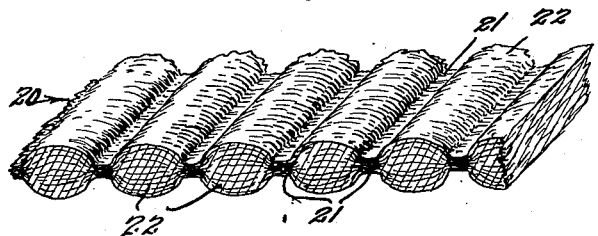
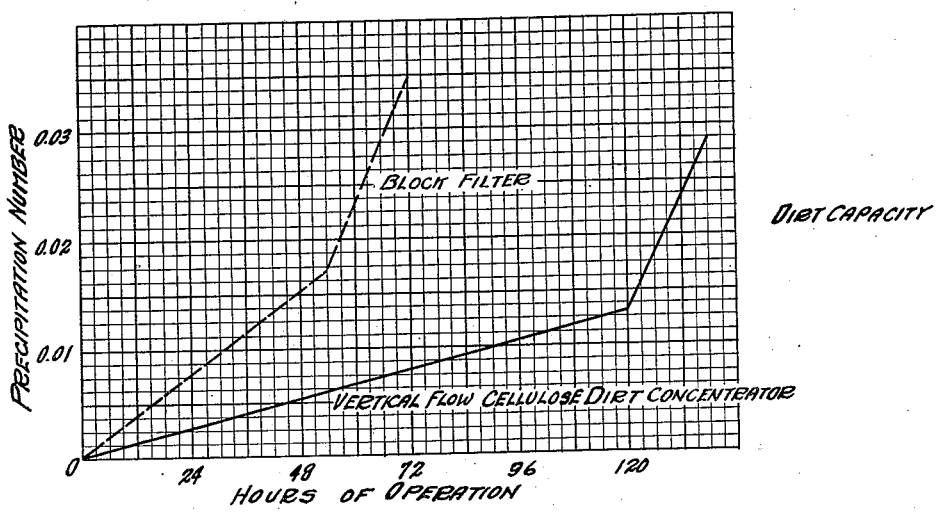
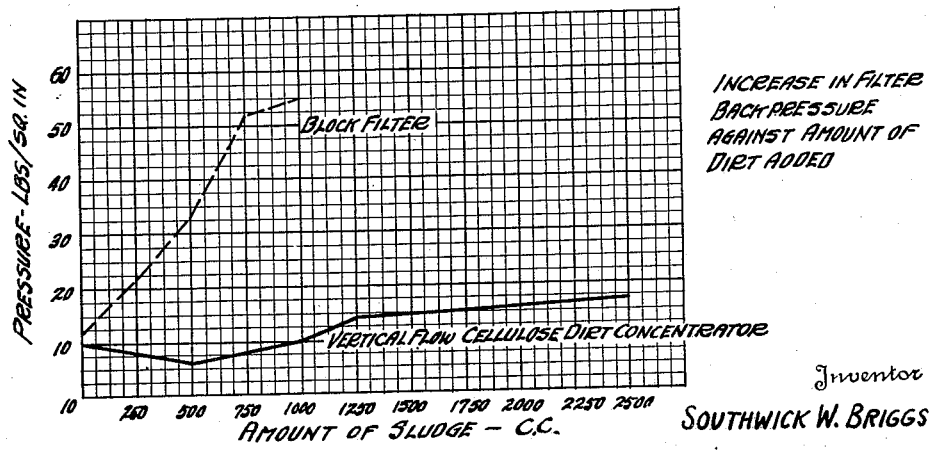
Inventor
SOUTHWICK W. BRIGGS
By Semmes, Keegin & Semmes
Attorney Patented June 15, 1943

2,321,985

UNITED STATES PATENT OFFICE 2,321,985

METHOD AND APPARATUS FOR SEPARATING SOLIDS FROM FLUIDS

Southwick W. Briggs, Washington, D. C., assignor to Briggs Clarifier Company, Washington, D. C., a corporation of Delaware Application October 28, 1938, Serial No. 237,553

6 Claims. (Cl. 210—204)

My invention relates to a method and to an apparatus for separating solids from fluids. There is a particular applicability in the field of removing suspended solid particles from oil, though it is not to be limited to application in this field, but is broadly capable of use in the separation of solids from any fluids.

Within the ordinary definition of the term, my device is not a filter though it performs the function of removing solid particles from fluids, which is a function usually performed by filters.

In separating solids from fluids in the ordinary type of filter where the fluid with the suspended solid particles therein is caused to pass through a filtering medium, such filtering medium gets dirty and it becomes increasingly difficult to pass the fluid through the filtering medium. Not only does the resistance go up during use, as shown by sludging tests, but there is a tendency for the filter to unload. Particularly when the filter has become dirty; filtering is stopped, and then started; at the start of a succeeding filtering operation the filter may unload.

My process, and the apparatus used therewith, permits of low pressure filtration. The flow of the fluid at the same pressure is greatly increased over the performance of filters heretofore used. For the same size device, a larger capacity for a given time of flow is possible than with the old style filter. The tendency of the device to plug, or to unload, is substantially eliminated. The useful life of the device is greatly increased over ordinary practice.

In general my process consists in passing the fluid with the suspended particles therein through channels whose surfaces are so formed as to impede and entrap the solid particles, though the fluid itself is not impeded to any considerable extent in its passage through the channels. I ordinarily employ a material for the channels which is formed of relatively loosely packed fibers. One form of material which I have found particularly good is an embossed cellulose wadding having ribs embossed thereon. The ribs form the channels, and on the ribs are entrapped the suspended particles.

One preferred form of my device comprises embossed cellulose wadding rolled upon itself with the direction of length of the ribs in the direction of flow of the fluid to be treated.

In the drawings:

Figure 1 is a longitudinal sectional view taken through my dirt concentrator or cleansing device;

Fig. 2 is an end view of the construction shown in Figure 1 with a portion broken away to more clearly indicate the construction;

Fig. 3 is a sectional view taken on the line 3—3 of Figure 1, looking in the direction of the arrows;

Fig. 4 is a detail perspective view of the embossed cellulose wadding which I employ;

Fig. 5 is a graph showing comparative performance between my fluid cleansing device and a standard fluid cleansing device of approximately the same size, the graph showing on the abscissa the hours of operation and on the ordinate the precipitation number;

Fig. 6 is a graph showing the performance of my device as plotted in comparison to a standard filter of approximately the same size, the graph having as an abscissa the number of cubic centimeters of sludge, and as an ordinate the back pressure exerted in pounds per square inch.

Referring to the drawings, I have shown a container can 1 adapted to contain a sludge removing element 2. The container can 1 is provided with a top 3 and a bottom 4. The top 3 is swaged, as indicated at 5, over the end of the circular can body 1, and likewise the bottom 4 is swaged, as indicated at 6, over the circular bottom of the side wall 1. The top 3 is provided with an annular recess 7, in which rests a washer 8. The washer 8 is held in place by the downturned end 9 of a central tube 10.

Likewise there is provided at 11 an annular depression in the bottom 4 in which rests a similar washer 12, held in place by the turned over end 13 of the central tube 10. The top 3 is provided with apertures 14 through which the fluid may pass. Also for the free flow of fluid through the sludge removing element 2 there are provided apertures 15 in the central tube 10.

The sludge removing element 2 is held in place by means of perforated spacers 16 and 17, having up-struck ends 18 and 19, respectively, which rest against the top 3 and the bottom 4.

The sludge removing element 2 is composed of rolled embossed cellulose wadding 20, indicated in detail in Figure 4. This cellulose wadding consists of laminations composed of fairly short fibers of cellulose which are pressed to form a sheet consisting of grooves 21 alternating with ribs 22. As indicated in Figure 4, the grooved sections 21 are more tightly compressed than the ridges or ribs 22.

The arrangement of this wadding 20 is such that the ribs 22 have their length in the direction of flow of the fluid through the cleansing device or regulator.

In operation the sludge removing element 2 takes the suspended solid particles out the fluid, such as in removing carbon particles from oil.

By reason of the rolling upon itself of the cellulose wadding, there are created a series of channels 23 (see Figure 3). The fluid flows freely through the channels, and in its flow deposits the solid particles suspended therein in the wadding 20. The exact theory of operation is not fully understood, but it is believed that the solid particles are absorbed by the loosely packed ribs 22 and their movement impeded by the fibers of cellulose.

Tests have been conducted comparing similar size filters of commercial type with this regulator device which is the subject matter of this application. The performance of these devices of approximately the same size indicates the great superiority of my invention over commercial devices now in use.

Charts 5 and 6 show the comparison just referred to. In the tests the following arbitrary conditions were set up for both the standard device on the market and my device:

Procedure of test

1. Temperature of oil, 130° F.
2. Pressure of oil at relief valve 30 lbs.
3. Rate of dirt feed, 27 to 33 cc. per hr.
4. Amount of oil in the circulating system, 7 quarts.
5. Viscosity of oil in circulating system, S. A. E. 30.

The test was run in the following manner:

The clean oil was placed in a reservoir and the circulation was started through the regulator at the time the heat was turned on. Thus the first half hour was run while the oil was still heating up. Sludge was continuously fed in at the above mentioned rate over the complete period of test. Complete pressure and temperature readings were taken every hour and a sample of oil for test was taken each six hours. The test was run for twelve hours and shut down a period of twelve hours and then started up again. An additional sample of oil was taken at each period of starting up in order to determine, if possible, the amount of back-wash due to a cold start.

This set up of twelve hour run and twelve hour shut-down was continued until an analysis of the oil showed that the filter was no longer functioning efficiently.

Analysis of oil

The American Society for Testing Materials analysis used to determine the quality of oil in the system was A. S. T. M. precipitation number. The filter was considered to have lost its efficiency when the A. S. T. M. precipitation number reached a value of .02.

It will be seen from the preceding description that I have devised a method and apparatus for removing suspended solid particles from fluids which increases the capacity of my device over the usual filter practice, prolongs the life of the device over that of the usual filter, permits free passage of the fluid at low pressures through the device, and minimizes blocking and unloading.

I claim:

1. A method of separating solids from fluids comprising passing a fluid having solids suspended therein lengthwise through a well-defined, relatively straight channel open at both ends, said channel being of restricted cross section but yet greater than the solid particles to be separated, a portion of the sides of said channel being formed of relatively loosely packed fibers and other portions being formed of closely packed fibers, whereby a substantial portion of the solids is deposited upon said fibers during passage of the fluid through the channel.

2. A method of separating solids from fluids comprising passing the fluid with the solids suspended therein lengthwise through well-defined channels formed by rolling upon itself embossed ribbed cellulose wadding, whereby solids are deposited during the passage of fluid through the channels formed between the ribs.

3. In a device for removing solids from fluids, a removing element comprising a roll of cellulose wadding embossed to form compressed indentations and loosely packed ridges which form, in the rolled sheet, channels extending from end to end of the roll and through which the fluid is adapted to longitudinally flow, said channels being relatively restricted in cross section and yet of a size larger than the size of the particles to be separated, and means to direct the fluid longitudinally through said channels and to prevent flow of the fluid transversely through said roll.

4. A device for removing solids from fluids comprising a receptacle consisting of a tubular wall member, and end members tending to close the wall member, a conduit within the receptacle extending from one end member to the other, apertures in the end members registering with the respective ends of the conduit, one of said end members being provided with an aperture in addition to the one registering with the conduit, and an aperture in the conduit adjacent the end remote from the last mentioned end member, and a sheet of embossed ribbed cellulose wadding wound around the conduit with the ribs parallel to the axis of the conduit, said ribs serving to form channels for the fluid of larger cross section than the solids to be removed, and means to maintain the roll of wadding spaced from the end members.

5. An apparatus for removing solids from fluids comprising a body of cellulosic material having a plurality of relatively straight channels extending therethrough, said channels being of restricted cross section but yet greater than the size of the solid particles to be separated, a portion of the sides of said channels being formed of relatively loosely packed fibers and other portions being formed of closely packed fibers, said channels being open at both ends for the free flow of the solid-containing fluid therethrough, and means for passing a fluid having solids suspended therein lengthwise through said channel and for preventing flow of fluid transversely through said body to cause a substantial portion of the solids to be deposited upon said fibers during passage of the fluid through the channels.

6. A filter unit for use in a clarifying apparatus for separating solid particles from a fluid comprising a casing having imperforate inner and outer tubular walls and perforate end walls, for the introduction of and discharge of fluid, a tubular body of fibrous material positioned therein, said fibrous body having a well defined channel extending from one perforate end wall to the other for the passage of fluid between said end walls, said channel being of restricted cross section but greater than the size of the solid particles to be separated from the fluid to permit the free flow of the solids containing fluid longitudinally through the channel.

SOUTHWICK W. BRIGGS.